United States Patent
Labudovic et al.

(10) Patent No.: US 10,171,755 B2
(45) Date of Patent: Jan. 1, 2019

(54) SYSTEMS AND METHODS FOR DETECTING LIGHT SOURCES

(71) Applicant: ELBIT SYSTEMS OF AMERICA, LLC, Fort Worth, TX (US)

(72) Inventors: Marko Labudovic, Fort Worth, TX (US); Jeremie Jackson, Fort Worth, TX (US); Martin Cielinski, Fort Worth, TX (US); Michael M. Tilleman, Fort Worth, TX (US)

(73) Assignee: Elbit Systems of America, LLC, Fort Worth, TX (US)

( * ) Notice: Subject to any disclaimer, the term of this patent is extended or adjusted under 35 U.S.C. 154(b) by 285 days.

(21) Appl. No.: 14/857,240

(22) Filed: Sep. 17, 2015

(65) Prior Publication Data

US 2016/0080668 A1  Mar. 17, 2016

Related U.S. Application Data

(60) Provisional application No. 62/051,732, filed on Sep. 17, 2014.

(51) Int. Cl.
*H04N 5/33* (2006.01)

(52) U.S. Cl.
CPC .................. *H04N 5/33* (2013.01)

(58) Field of Classification Search
CPC ........................................ H04N 5/33
USPC ........................................ 348/164
See application file for complete search history.

(56) References Cited

U.S. PATENT DOCUMENTS

| | | | | |
|---|---|---|---|---|
| 9,177,204 | B1 * | 11/2015 | Tiana | G06K 9/0063 |
| 9,674,413 | B1 * | 6/2017 | Tiana | H04N 5/2254 |
| 2006/0197006 | A1 * | 9/2006 | Kochi | H01L 27/14621 |
| | | | | 250/208.1 |
| 2009/0009596 | A1 * | 1/2009 | Kerr | G01S 1/70 |
| | | | | 348/117 |
| 2011/0149070 | A1 | 6/2011 | Huang | |
| 2012/0007979 | A1 * | 1/2012 | Schneider | G01J 3/36 |
| | | | | 348/116 |

(Continued)

FOREIGN PATENT DOCUMENTS

| | | |
|---|---|---|
| WO | 2014037866 | 3/2014 |
| WO | 2014108905 | 7/2014 |

OTHER PUBLICATIONS

International Search Report and Written Opinion for PCT Application No. PCT/US2016/051845, dated Jul. 13, 2017.

*Primary Examiner* — Francis Geroleo
(74) *Attorney, Agent, or Firm* — Conley Rose PC

(57) ABSTRACT

A method for detecting light sources. The method includes capturing an image including a sub-infrared light emitter, applying a filter to a pixel of the captured image to isolate a signal strength of a range of frequencies, and comparing the signal strength of the filtered pixel to an expected signal strength of a background spectra for the range of frequencies. As a result of a difference between the signal strength of the filtered pixel and the expected signal strength exceeding a predetermined threshold, the method includes identifying the pixel as corresponding to a light emitter. As a result of the difference between the signal strength of the filtered pixel and the expected signal strength not a predetermined threshold, the method includes identifying the pixel as not corresponding to a light emitter.

17 Claims, 11 Drawing Sheets

(56) References Cited

U.S. PATENT DOCUMENTS

2013/0049927 A1    2/2013   Takashi
2015/0002026 A1    1/2015   Koninklijke

* cited by examiner

SYSTEMS AND METHODS FOR DETECTING LIGHT SOURCES

CROSS-REFERENCE TO RELATED APPLICATIONS

This application claims the benefit of U.S. Provisional Patent Application No. 62/051,732 filed Sep. 17, 2014, and entitled "Systems and Methods for Detecting Light Sources," which is incorporated herein by reference in its entirety for all purposes.

BACKGROUND

Light emitting sources, such as light emitting diodes (LEDs) are increasingly used for their efficiency and longevity relative to conventional light sources. In particular, in the aviation context, LEDs may be used in an Approach Light System (ALS) or Medium Intensity Approach Lighting System with Runway Alignment Indicator Lights (MALSR) of an airport runway. However, unlike conventional light sources, LEDs used for lighting purposes, generate a spectrum in the visible range but do not generate an IR spectrum component. Thus, conventional enhanced vision systems, such as those that rely on forward looking infrared (FLIR), which detects the IR component of light emitters, are ineffective in detecting sources such as LEDs, whose spectrum is contained only in the visible range.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
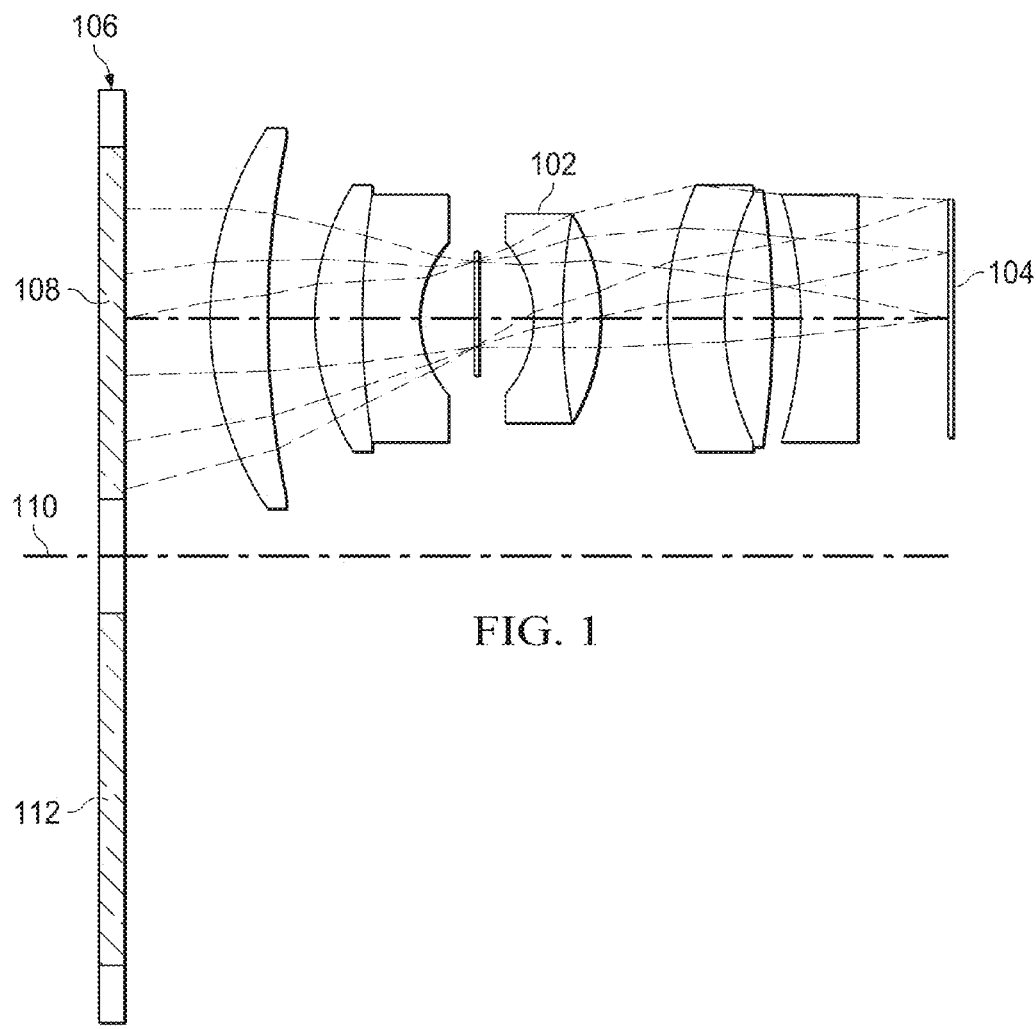
FIG. 1 shows a system utilizing optical bandpass filters in accordance with various embodiments of the present disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

This disclosure is generally directed to vision enhancement through turbid media, such as fog and cloud cover that occupy an operator's field-of-view. In particular, embodiments of the present disclosure may be applicable in aviation fields or other areas in which enhanced vision is desirable, such as automotive or marine fields. The disclosed systems and methods enhance the ability to perceive light emission from sources that have no IR component, such as light emitting diode (LED) sources that emit light exclusively in the visible range. Prior art enhanced vision devices, which are typically based on forward looking infrared (FLIR) technology, are only designed to detect the IR component of a light source, and thus are ineffective in detecting certain light sources such as LEDs, whose spectrum is contained in the visible range. Throughout the present disclosure, reference will be made to LEDs for simplicity; however, it should be understood that embodiments of the present disclosure may be equally applicable to other visible light sources that have no or a minimal IR component, and thus cannot be detected with conventional IR detection technology. These may also be referred to as sub-infrared light emitters, which contain no or a minimal IR component. One feature of this disclosure is the detection of light in the visible spectrum from a distance that exceeds the local visibility range, particularly where this range is further limited by turbid media.

The present disclosure is directed to a camera system and a method for detecting light sources that are obstructed by a turbid medium, even where these sources would be undetectable by the human eye or by enhanced, contrast-based, non-spectral image processing, such as FLIR. In some embodiments, the system comprises a pixelated sensor, an optical bandpass filter or set of filters, an imaging lens, and a processor. The sensor, which is preceded in an optical path by the filter and the imaging lens, receives a set of images whose colors are defined by the bandpass filter(s). As a result, predominantly, a set of narrow, monochromatic images are rendered at the sensor, with varying signal content, which are subsequently transferred to the processor.

In accordance with certain embodiments, the processor executes an algorithm to process the image data by using the pixel coordinates and color, which reduces the level of background and clutter. The algorithm generates an image where light emitters such as LEDs become enhanced by a multi-spectral process, producing a visible image to the viewer, despite the fact that the LEDs are rendered invisible to the unaided eye by the turbid medium set between the LEDs and the viewer. In accordance with various embodiments, the optical filters employed in the above-described system and method may span a broad range of the electromagnetic spectrum, between the ultraviolet, through the visible, to the infrared regions.

In one particular embodiment, the above-described detection system is deployed on board an aircraft, enhancing the pilot's ability to navigate in inclement weather and inferior visibility. In this case, the present disclosure may be referred to as one related to "instrument enhanced navigation" and may be included in the image presented to a heads up display (HUD) or heads down display (HDD).

Chromatic Filter

Rendition of a set of disparate monochromatic images can be accomplished by several means. In one embodiment an array of optical bandpass filters is disposed before the imaging lens, such that only one filter with a single bandpass is positioned in the field-of-view at a given time, for a given camera shot. Then the filters are swapped. Following a camera take, the filter array is moved, synchronously with the camera frame rate, to a new position such that another filter with another single bandpass is positioned in the field-of-view, and a new camera shot is taken. This process is repeated until camera takes with the entire set of filters have been made. In an embodiment the filters are placed in a rotating filter-wheel, as shown in FIG. 1. Here the camera lens 102 images rays originating, for example at infinity, on a focal plane 104, being a locus of the camera sensor. Further the filter-wheel, the cross section of which is indicated as 106, holds optical bandpass filters, two of which are shown herein as 108 and 112. The wheel is rotatable about the axis 110. In another embodiment, the filters are placed in a linearly translating filter strip. In yet another embodiment, the filters are placed in a matrix with a two-dimensional translation capability.

In a second embodiment, a tunable optical bandpass filter is disposed before or inside the imaging lens. The tunable filter may be one of a number of such filters, for instance: a tilting, angularly movable, transmissive tunable filter; a liquid crystal tunable filter; an acousto-optical tunable filter; or a grating diffractive tunable filter.

Figure 2:
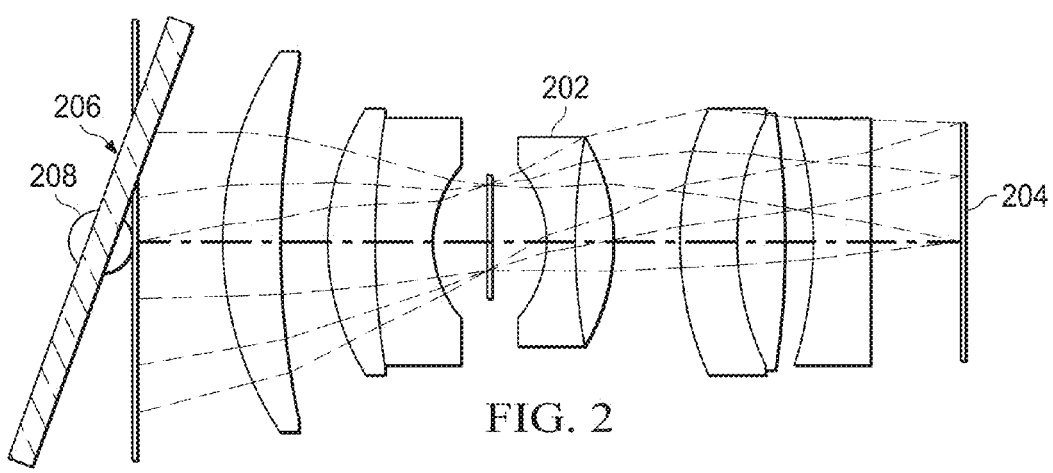
FIG. 2 shows a system utilizing tunable filter in accordance with various embodiments of the present disclosure.

FIG. 2 illustrates an embodiment employing a tilting, transmissive tunable filter 206. A camera lens 202 images rays (e.g., that may be considered to originate at infinity) on a focal plane 204, coinciding with the surface of the camera sensor. Further the tunable filter 206 is tilted by a rotating device 208. The center wavelength of the filter band is a function of the angle at which the tunable filter is set. Thus the bandpass spectrum shifts on tilting the filter.

Figure 3:
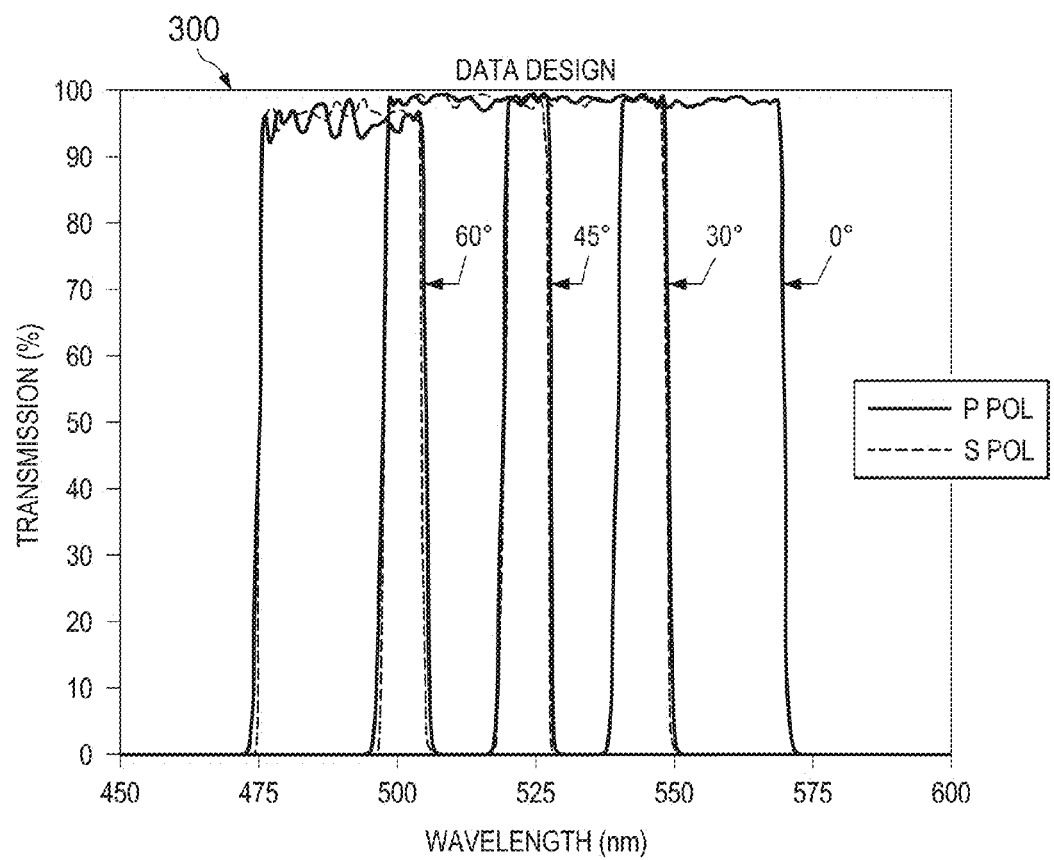
FIG. 3 shows a plot of filter transmission bands of a tunable filter as a function of the filter angle in accordance with various embodiments of the present disclosure.

FIG. 3 shows a plot 300 of the bands as a function of the filter angle. The slight differences in the spectra for the s-polarization and the p-polarization, occurring at tilting angles greater than zero, provides a slight offset that can be accounted for in the selection of the bands and their center wavelengths.

Figure 4:
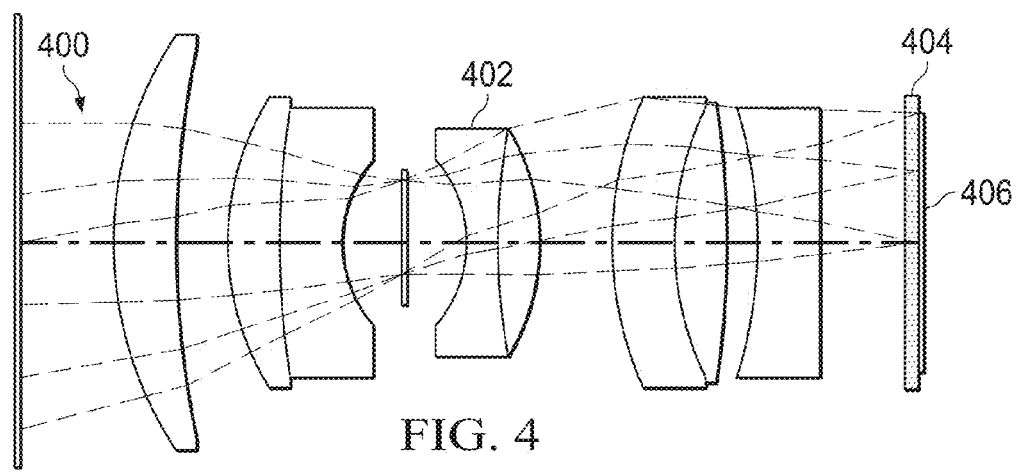
FIG. 4 shows a system utilizing a filter array and a focal plane array coinciding with the surface of a camera sensor in accordance with various embodiments of the present disclosure.

FIG. 4 shows an additional embodiment in which an array of optical bandpass filters are disposed before the camera sensor. In the present disclosure, the filter mosaic contains optical bandpass filters corresponding to various wavelengths, or bands, and arrayed in a two dimensional pattern. In certain embodiments, the bands may be arrayed cyclically at a certain period. For instance, if the bands are centered around the wavelengths of 450, 475, 500, 525, 550, 575, 600, 625, 650, 675, 700, 725, 750, 775, 800 and 825 nm, the corresponding filters are arrayed in a square of 4×4 having four columns containing the following bands: 1) 450, 475, 500, 525 nm, 2) 550, 575, 600, 625 nm, 3) 650, 675, 700, 725 nm, and 4) 750, 775, 800 and 825 nm. The above example does not represent a limiting embodiment, and other arrays may be equivalently utilized. In some embodiments, no two filters of a like color are adjacent to one another.

Figure 5:
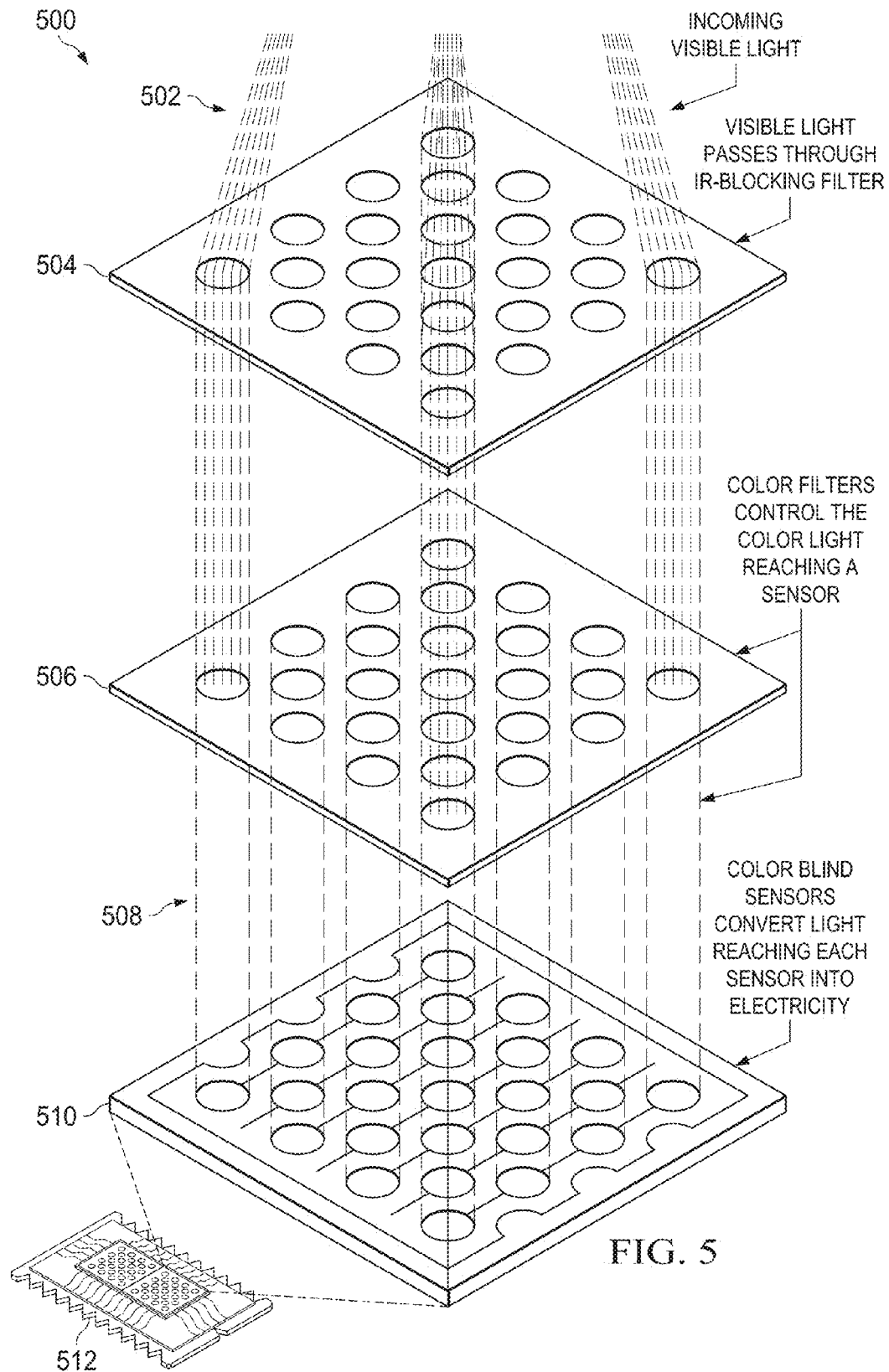
FIG. 5 shows an exploded view of a schematic of a filter array, a lenslet array, and a sensor in accordance with various embodiments of the present disclosure.
Figure 6:
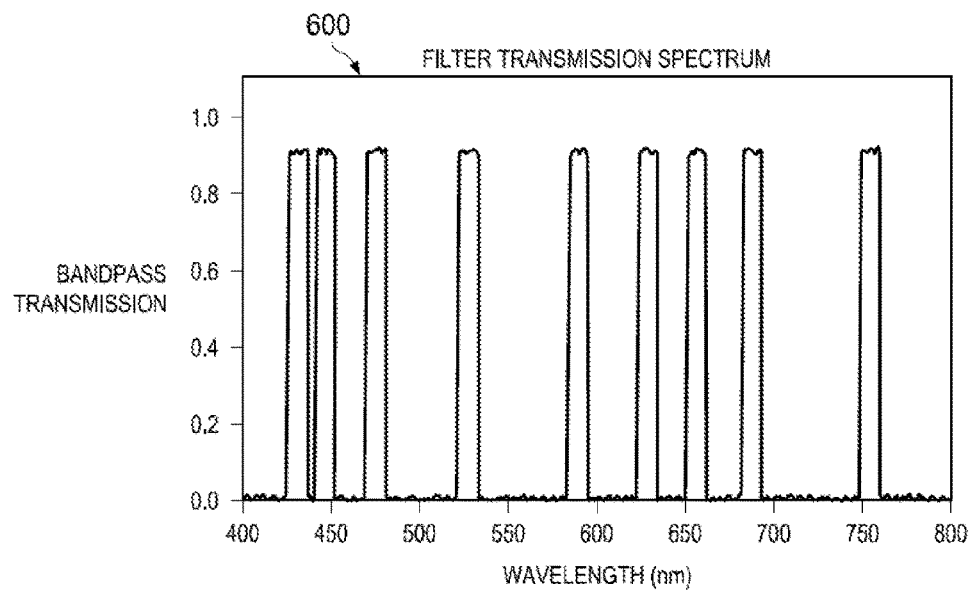
FIG. 6 shows a plot of filter transmission spectra of bandpass filters in the array of FIG. 5 in accordance with various embodiments of the present disclosure.

In yet another embodiment, the array pitch and each elemental filter in the array is equal to the pitch and size of the sensor pixel in a manner that once packaged together, each filter overlaps one pixel. In this arrangement, various pixels become sensitive predominantly to a certain color, within the spectral range of the filter bandwidth. Illustrations of this embodiment are shown in FIGS. 4-6. In FIG. 4, rays 400 (e.g., that may be considered to originate at infinity) are imaged by a camera lens 402 through a filter array 404 on a focal plane 406 coinciding with the surface of the camera sensor. From the polychromatic rays 400, only those colors (or wavelengths) transmitted by the individual filters of the array 404 arrive as predominantly monochromatic rays at the sensor 406. FIG. 5 illustrates a blown-up schematic of the filter array and sensor unit 500, where polychromatic incoming visible light rays 502 are incident on a lenslet array 504. The visible light rays 502 pass through an array of bandpass filters 506. The visible light rays 502 are thus filtered and monochromatic rays 508 are predominantly transmitted, which subsequently arrive onto the sensor pixels 510. In one embodiment, the sensor pixels 510 are of a CMOS type sensor 512. FIG. 6 shows an exemplary plot 600 of transmission spectra of bandpass filters in the array 506 shown in FIG. 5. Further, and as will be described in further detail below, the exemplary bandpass filters of FIG. 6 correspond to expected peaks and troughs of, for example, a white LED spectra, which can be utilized to further exemplify spectral regions in which the LED is particularly distinguishable from a background spectra.

In accordance with embodiments of the present disclosure, known spectral structures of the object light emitters are leveraged. The detailed spectra are expected to vary slightly from lamp to lamp. To address this, particular filter bands are selected to accommodate this variation. As such, it is not particularly important to have an exact spectral match, since all LEDs of a similar color are more or less prone to generate similar spectral patterns, even in the case of broadband LEDs. For instance, white LEDs have a typical spectrum characterized by the Correlated Color Temperature (CCT), which is specified for the object lamp type, while color selections of LEDs are specified by their wavelength range. Embodiments of the present disclosure allow for identifying the presence of LEDs in a scene independent of their specific spectral shape. In particular, an analysis of the relative differences in spectra in the identified filter bands (e.g., those corresponding to known LED spectra) versus that of the spectral signature of background scene is leveraged to identify the presence of LEDs in a captured scene.

Figure 12:
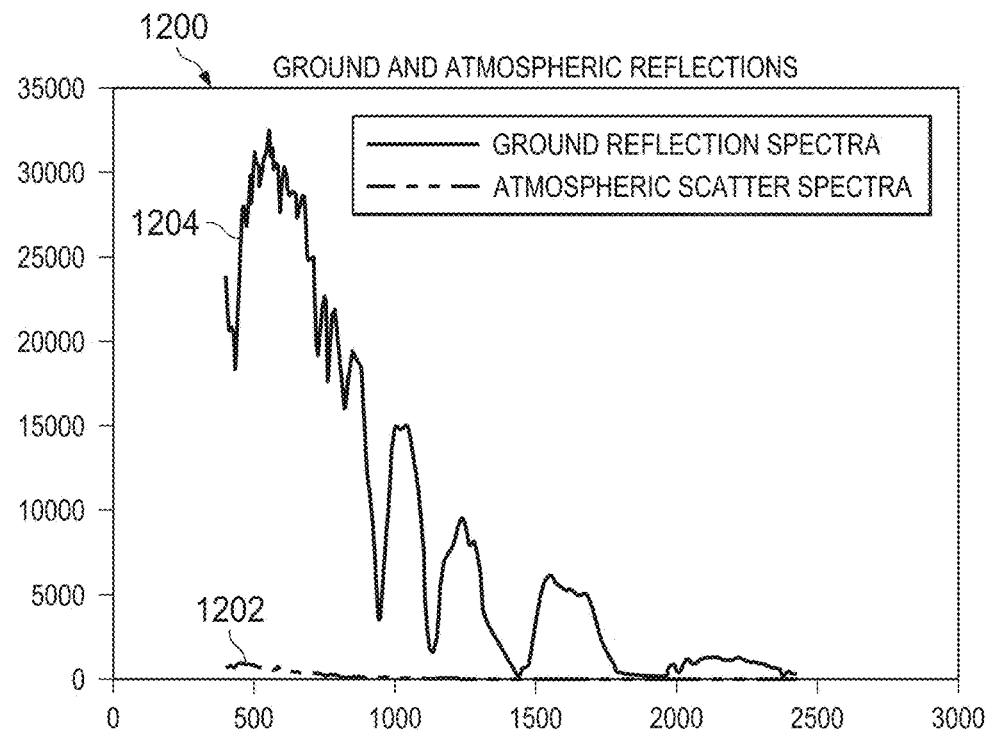
FIG. 12 shows exemplary ground reflection and atmospheric scatter spectra in accordance with various embodiments of the present disclosure.

In accordance with certain embodiments, the background scene is characterized to provide known ground reflection coefficients as a reference to compare against known atmospheric radiance spectra inclusive of down-welling radiance spectra. FIG. 12 shows an example characterization 1200 of the average ground reflection spectra 1204 in comparison to average atmospheric scatter spectra 1202 as a function of wavelength, including both the visible spectrum and wavelengths outside the visible spectrum. It can be seen that the atmospheric portion of the spectra 1202 is essentially a noise source and thus may be eliminated by normalizing the observed image (e.g., subtracted from the measured data to produce a normalized ground reflection component, assuming the absence of light emitters such as LEDs).

Embodiments of the present disclosure may utilize various methods, such as the use of narrow band filters, to separate an individual LED emission from an otherwise cluttered spectral background. In particular, reliance is made upon the improved signal to noise of a narrow portion of the spectrum (i.e., where the LED spectrum displays peak(s)) to better isolate the LED signal from the background. Certain embodiments may rely on signal averaging to do so to improve the realizable signal to noise ratio, although certain embodiments do not necessarily rely on the presence of such averaging to discriminate between the LED signal and background spectra. One benefit of the disclosed systems and methods is that eliminating the background signal completely is not required in order to identify LED light sources.

Figure 8:
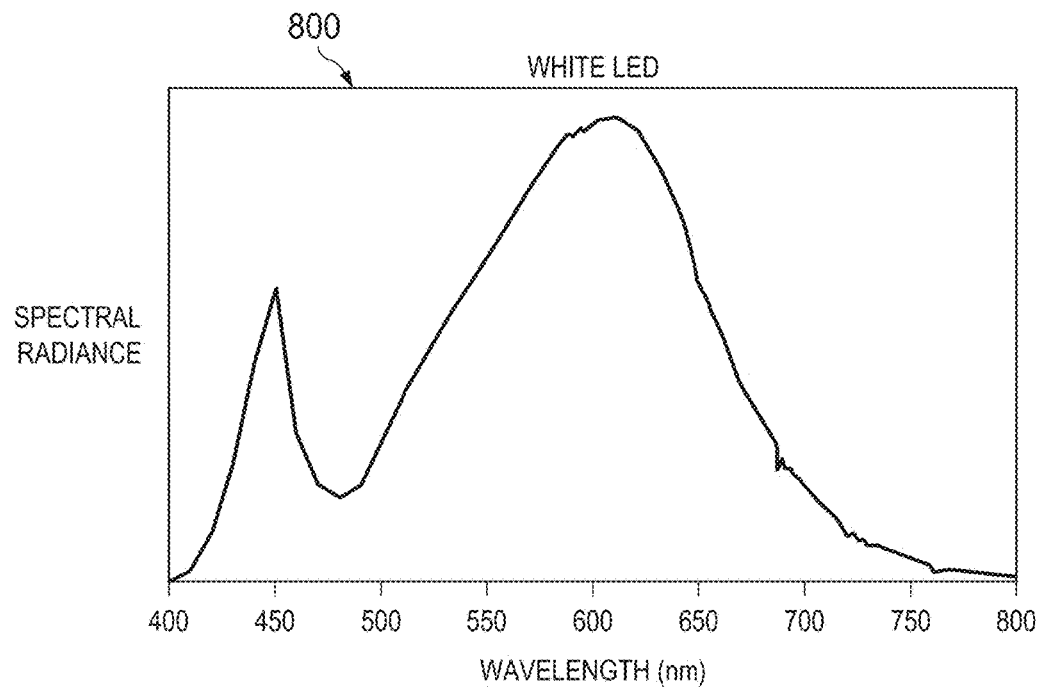
FIGS. 8-10 show emission spectrums of various colors of light emitters in accordance with various embodiments of the present disclosure.
Figure 9:
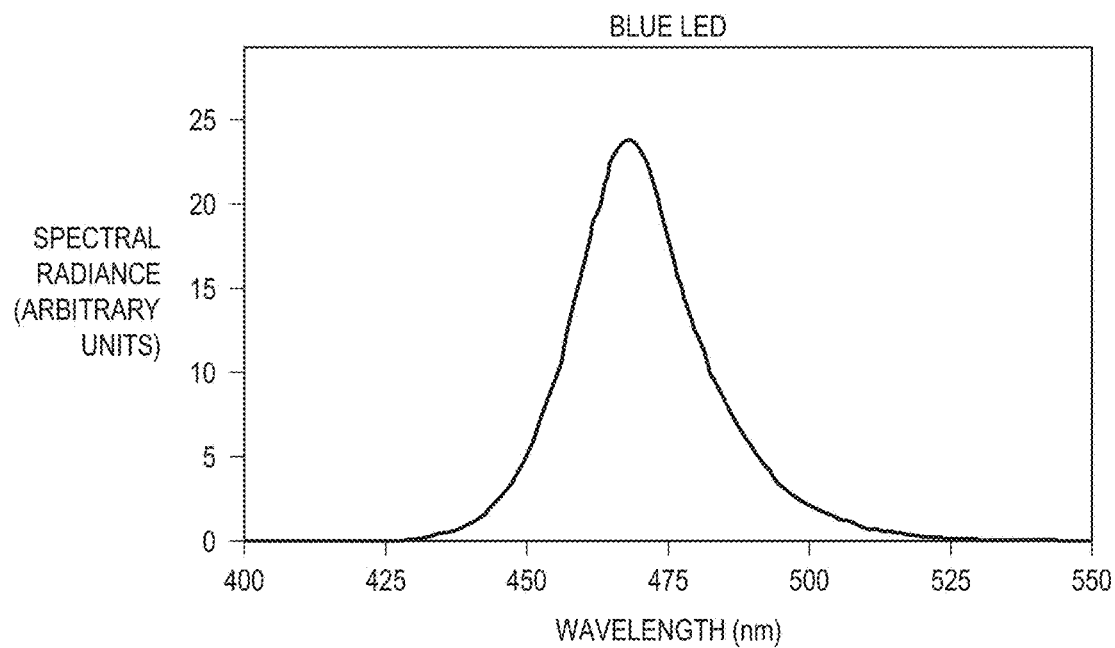
Figure 10:
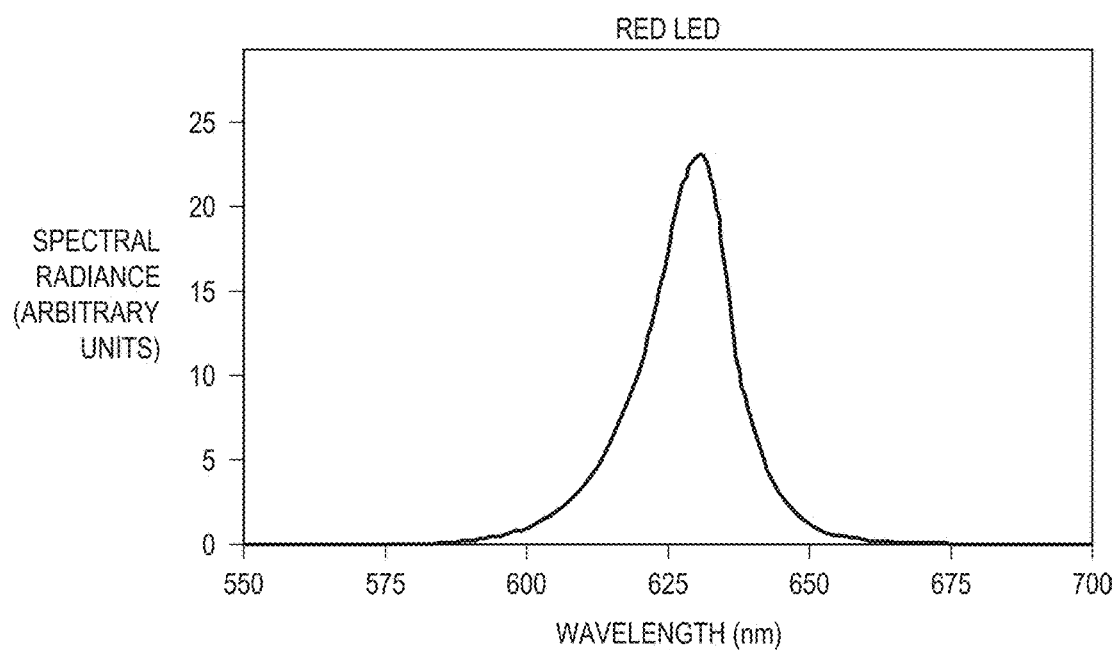

Turning to FIG. 8, a fairly broad white LED spectrum 800 is shown for exemplary purposes. The white LED case demonstrates that a relatively small number of filters may be employed to capture the expected spectral peaks of the LED relative to the background. Of course, it should be understood that where multiple LED types are expected (i.e., a more general LED case), a larger set of filters may be employed to suitably capture each expected LED type. For example, FIGS. 9 and 10 demonstrate that blue and red LEDs may generate peaks at different wavelengths, which could then be detected by centering a band on those particular wavelengths. The importance of the filter selection is to identify those regions in which the LED source is disparate from the background in terms of its relative spectral content. The magnitude of the signal will also depend upon the collection width of the system.

Figure 13A:
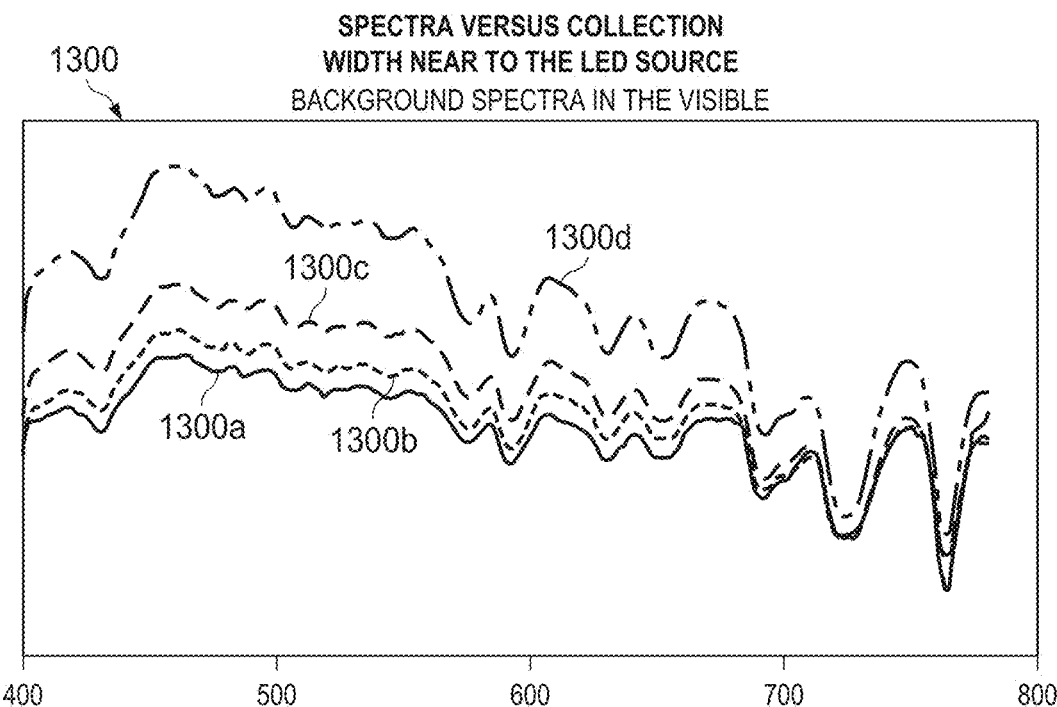
FIG. 13a shows a visible portion of the background spectra normalized for atmospheric scatter and FIG. 13b shows an exemplary spectra for a white LED in accordance with various embodiments of the present disclosure.

FIG. 13a demonstrates background reflection spectra 1300 that has, in this case, been normalized to eliminate the contribution of atmospheric scatter 1202 shown in FIG. 12 and isolated in the visible range. As can be seen, the background spectra 1300 is largely flat in the visible portion of the spectrum particularly when discounting the variations due to the atmosphere 1202 itself. As a result of this relative flatness in the visible portion of the spectrum, varying selections of filters in the visible range will provide nearly the same signal level for the background spectra regardless of particular filter values.

Figure 13B:
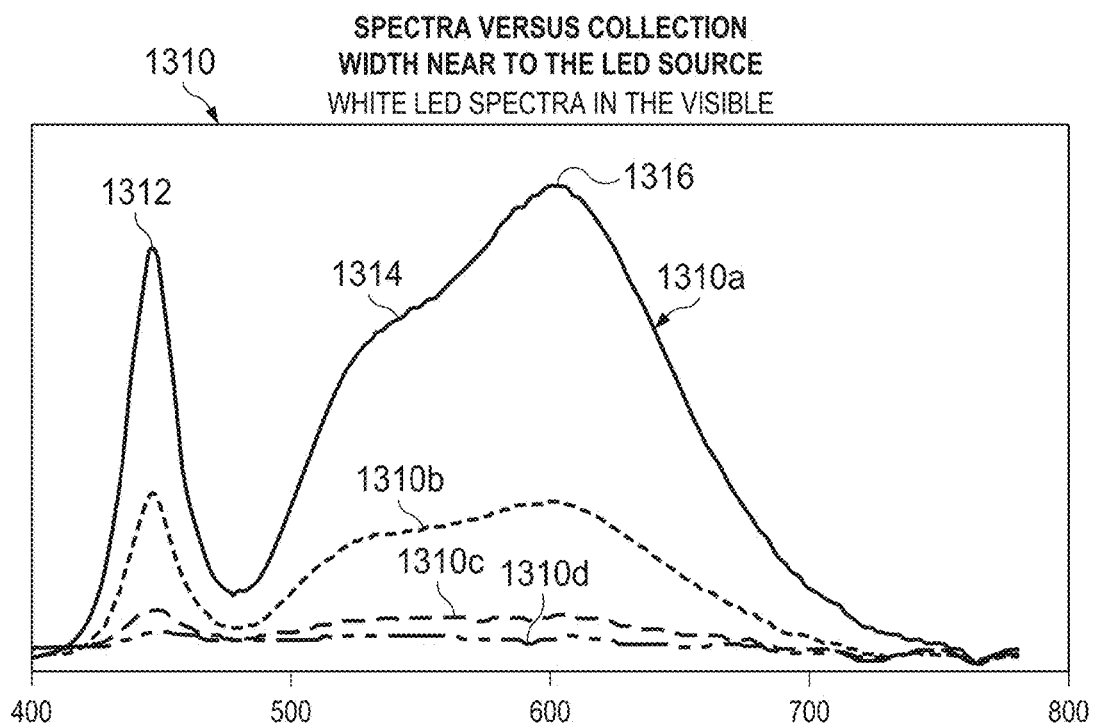

As can be seen in FIG. 13b, however, a white LED spectra 1310 contains pronounced peaks 1312, 1314, 1316 in the visible range. These portions 1312, 1314, 1316 of the white LED spectra 1310 provide a strong contrast with the expected background 1300. In accordance with embodiments of the present disclosure, a selection of filter bands is carried out to leverage these areas of greater difference between LED spectra 1310 and an expected background spectra 1300.

Figure 14:
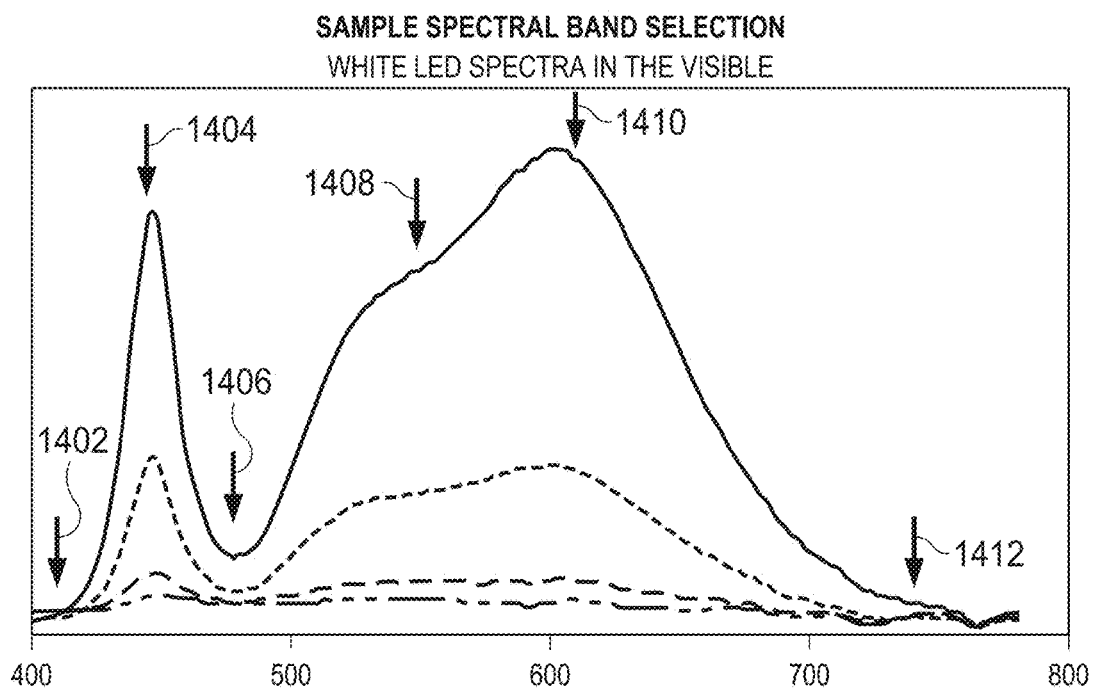
FIG. 14 shows sample frequency filter ranges in relation to the white LED spectra in accordance with various embodiments of the present disclosure.

FIG. 14 demonstrates an exemplary selection 1400 of six filter bands 1402, 1404, 1406, 1408, 1410, and 1412. The band 1402 corresponds to wavelengths of 415-435 nm; the band 1404 corresponds to wavelengths of 440-460 nm; the band 1406 corresponds to wavelengths of 470-490 nm; the band 1408 corresponds to wavelengths of 550-570 nm; the band 1410 corresponds to wavelengths of 605-625 nm; and the band 1412 corresponds to wavelengths of 750-770 nm. As should be appreciated, the selection 1400 is for illustrative purposes, and the number and absolute placement of the filters shown is not intended to limit the scope of the present disclosure, including the claims. In fact, in certain embodiments the selection of the filter bands may be determined experimentally based on the types of peaks and troughs expected for a particular illumination source.

In the exemplary selection 1400, three of the filters 1404, 1408, 1410 have been chosen to correspond to the peaks of the LED spectra 1310 while the other three 1402, 1406, 1412 have been chosen to correspond to the troughs of the LED spectra 1310. In this manner, it becomes easier to distinguish which spectra are observed in FIG. 13. In the case where LEDs are present in the captured image data, it is expected to see a higher signal in bands 1404, 1408, 1410 than in bands 1402, 1406, 1412. However, in the case where a background scene is observed in captured image data, it is not expected to see an appreciable difference in signal strength across the bands 1402-1412.

FIGS. 13a and 13b also demonstrate that as the collection width of the system in angle, or even in spectral width, is opened, more signal is collected. For example, the specific plots shown by 1300a-d represent background reflection spectra observed with increasingly wider collection widths. As the collection angle of the system or the spectral width of the filters is increased, a corresponding increase in the signal that is collected on the sensor is observed. At the same time, however, the contrast of the LED spectra 1310 in relation to the background is reduced as in FIG. 13b. As with FIG. 13a, the specific plots shown by 1310a-d represent LED spectra observed at increasingly wider collection widths. In particular, 1310c and 1310d are produced at such high collection width or spectral width of the filters that the peaks found in the LED spectra are virtually eliminated.

As a result, it can be seen that narrow collection widths provide an improved contrast with respect to the background scene 1300 since the LED spectral differences dominate the captured image when nearer to the source (i.e., LED), while increasingly wider widths begin to smooth out the white LED spectra 1310 in relation to the background scene 1300. Unlike non-imaging narrow spectral band applications, however, embodiments of the present disclosure leverage both spectral properties as well as imaging properties of the disclosed optical system to exploit knowledge of various light emitters to more effectively filter those emitters from a background scene.

Embodiments of the present disclosure utilize a careful selection of filter values to be wide enough to collect enough energy to form the image while remaining narrow enough to provide sufficient spectral resolution in the scene. Embodiments of the present disclosure also utilize a sensor portion of the system that is configured to resolve the individual LED sources at the desired range, which of course may vary based on the particular application. In an aviation context, for example, a desired range may be several kilometers ahead of the aircraft. Similar to band selection, the sensor portion also needs to be wide enough to collect enough energy while remaining narrow enough to provide a clear distinction when an LED source is present in the scene. The sensor parameters may therefore be selected to take advantage of the selected band centers and spectral widths so the camera-control parameters are capable of acquiring useful information from the algorithm. By way of example and not limitation, in the case of aviation applications, a sensor may provide at least a 30 deg×40 deg field of view with sub-milliradian resolution in the scene to provide adequate situational awareness. This selection is clearly dependent upon the particular application of the system under consideration, so the scope of the present disclosure, including the claims, is not limited to a particular collection width of the either the optics or the spectral filters. Similar methodologies may be applied regardless of the final application.

Figure 15:
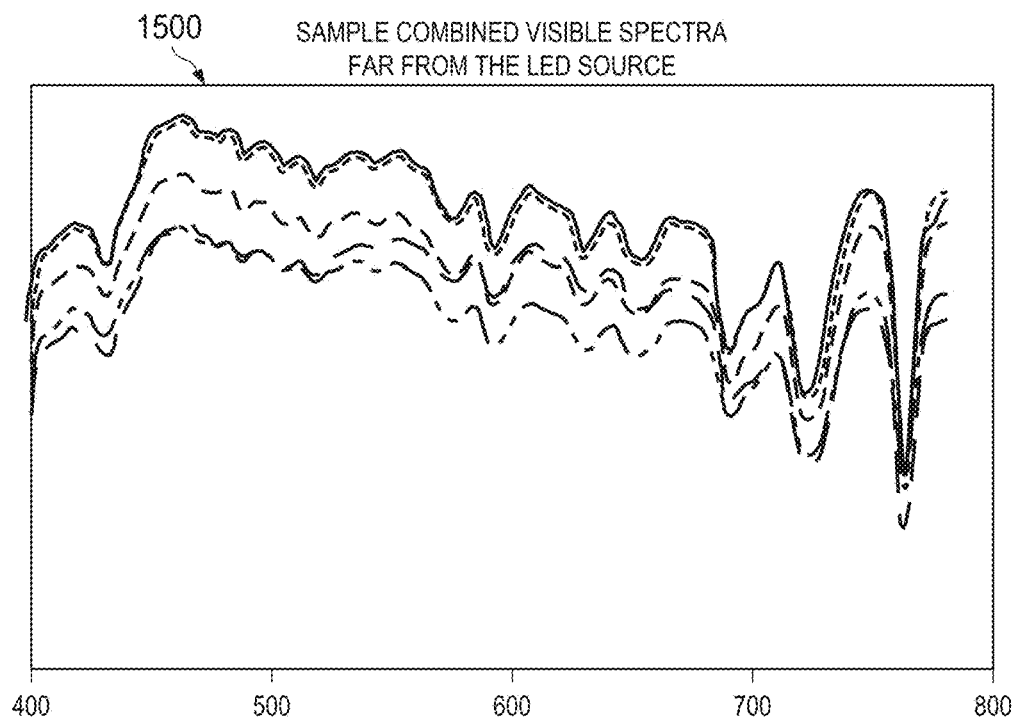
FIG. 15 shows an exemplary combined visible spectra including both background and LED components in accordance with various embodiments of the present disclosure.

Unlike traditional means of providing spectral discrimination, where only a narrow range of the spectrum is considered, a representative image of the scene can still be created from the overlay of the selected bands. Unlike traditional means of imaging, a reliable indication of the presence of LED sources can be distinguished from the background even when the LED sources are not visible in the overall scene. This is more clearly distinguished when considering the spectra at larger ranges in the presence of atmospheric absorption and scatter effects. As one example, FIG. 15 shows measured sample spectra 1500 in the visible region based on the above-described example using six filters. The measured sample spectra 1500 is generated at a distance of one mile between an LED source and an optical sensor, and considers the impact of path attenuation by drizzle and fog. The differing plots relate to different pixels of a captured image. As can be seen, there is no longer any clearly distinguishing presence of the LED spectra in the combined captured image spectra. The image is also largely dominated by fog, so the background scene itself is not distinguishable. In these conditions, embodiments of the present disclosure provide an overlay (e.g., on a HUD) of the LEDs 1102 in and otherwise degraded visual environment, resulting in an image similar to that shown in FIG. 11.

Referring back to FIGS. 12-14, the detailed spectra shown demonstrates the magnitude of the spectral discrimination problem. These figures are not intended to limit the scope of the disclosure to the particular embodiment of this disclosure that relies on a small number of filters, which have been selected to specifically identify individual sources in the scene, such as LED lighting. Although each of the filter bands 1402-1412 contains only a portion of the overall spectra (e.g., a subset of the visual range) of the scene, each band 1402-1412 covers the same object scene; that is, the filter bands are applied to the same captured image. Their individual pixels can therefore be correlated back to the captured scene and overlap each other in the image. In this fashion, each band sees a similar portion of the scene, but at a different wavelength. Thus, in some cases, individual scene pixels are queried to determine whether bands 1404, 1408, 1410 are stronger than expected in comparison to bands 1402, 1406, 1412 to determine the presence of a white LED source in an otherwise indistinguishable spectrum.

Figure 16:
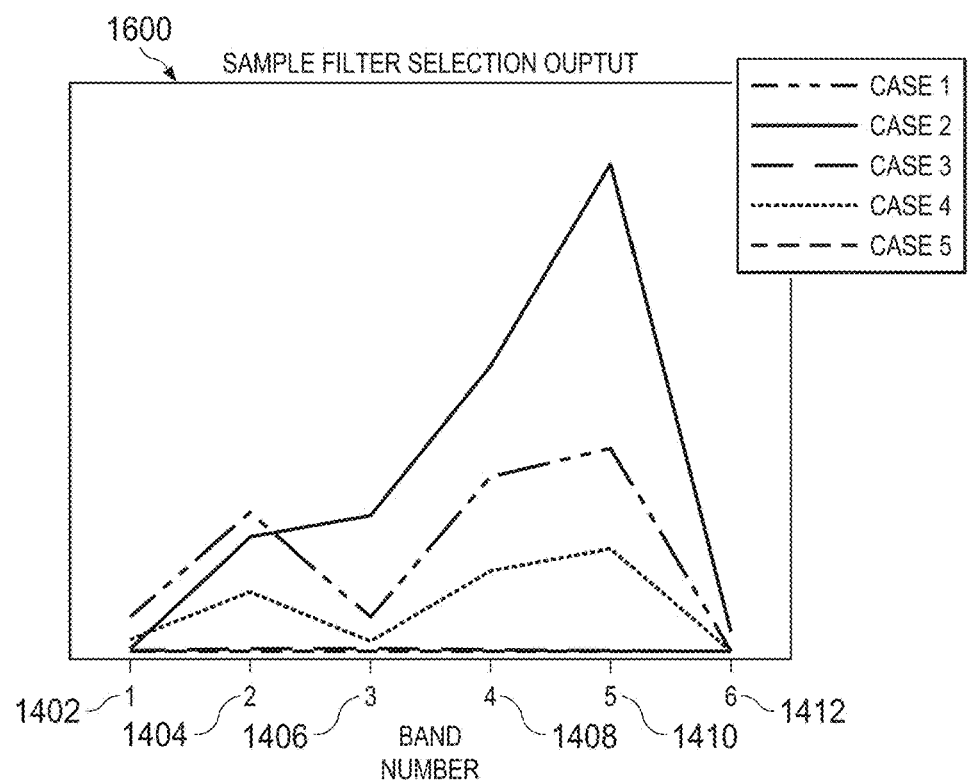
FIG. 16 shows a signal strength plot of an output of the filters of FIG. 14 for various pixels which correspond to the presence or absence of a light emitter in accordance with various embodiments of the present disclosure.

In accordance with embodiments of the present disclosure, the combined visible spectra 1500 shown in FIG. 15 is sampled by the selected filters 1402-1412 shown in FIG. 14 to provide a sample filter selection output 1600 shown in FIG. 16. The sample figure output 1600 in FIG. 16 demonstrates the impact of the disclosed spectral discrimination systems and methods. The sample output 1600 has been calibrated with respect to the average background to provide a spectral comparison on a pixel by pixel basis in the image. As shown, cases 1-5 correspond to five different pixels of a particular captured image. Although the signal strengths of pixels 1, 2, and 4 vary somewhat, these pixels are clearly distinguished from pixels 3 and 5, which register no substantial peaks whatsoever. In accordance with various embodiments, it may be determined that pixels 1, 2, and 4 correspond to an LED source since the relative signal in bands 1404, 1408, 1410 (as explained above, these bands correspond to the expected peaks of a white LED) is higher than in bands 1402, 1406, 1412. At the same time, pixels 4 and 5 are indistinguishable from the expected background spectra. In accordance with certain embodiments, the results of such a pixel-by-pixel (or groups of pixels-by-groups of pixels) determination may be stored in various formats, such as a bitmap where a positive or true value for a pixel denotes that pixel is associated with the presence of an LED against the background scene and a negative or false value for a pixel denotes that pixel is not associated with the presence of an LED against the background scene. Of course, this is just one exemplary storage scheme. Subsequently, the bitmap or similar image may be overlaid to a conventional captured scene as is the case with a HUD for example, giving an operator (e.g. pilot of an aircraft) the ability to perceive the LED sources despite the fact that those LEDs may not be visible to the naked eye due to distance, atmospheric conditions, or a combination thereof.

As shown above, the ability to distinguish individual LED sources from the background spectra depends on both filter selection and collection angle. Further, the impact of range also should be considered, since an individual pixel at larger ranges will inherently cover a larger portion of the scene than the same pixel will cover ranges closer to the LED source. Since the source is a fixed size, it will occupy an increasingly diminishing portion of the pixel's signal as range is increased, similar to what is shown in FIG. 13. Embodiments of the present disclosure address this issue, which is a fundamental aspect of any imaging system.

Figure 17:
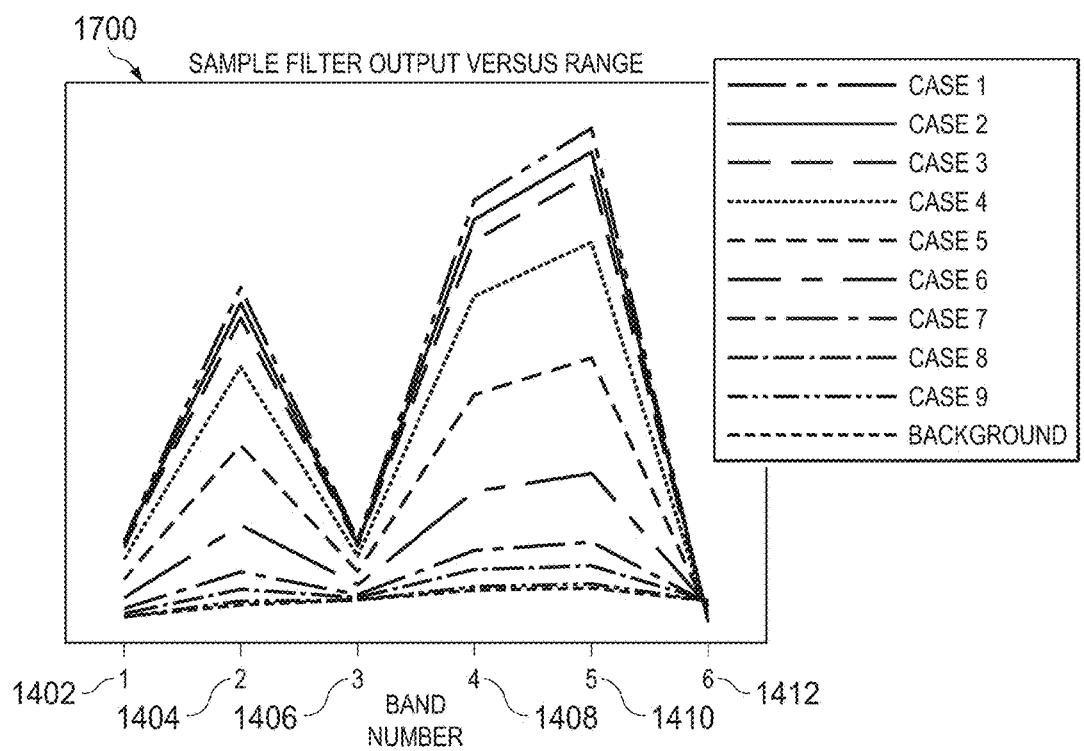
FIG. 17 shows a signal strength plot of an output of the filters of FIG. 14 as a function of range in accordance with various embodiments of the present disclosure.

For example, FIG. 17 demonstrates sample resulting filter output 1700 where six exemplary filters described above are employed and a single source whose position is gradually moved further away from the system optics. The individual cases, labeled 1-9 on the plot, represent increasingly larger ranges from an LED source in comparison to the expected limit of the background. As can be seen, and as with any optical imaging system, a fundamental limit exists on the maximum range at which an LED source can be distinguished from the background which. One of ordinary skill will appreciate this limit is a function of the optical sensor design and may vary with application. However, depending on the particular application, a bottom threshold may be set such that peaks below that threshold (e.g., detected peaks that are not more than a certain amount of spectral energy above the background) are not reported as positive identifications of a light emitting source. In particular, in the aviation field where safety and confidence are of high importance, some bottom threshold may be established in which peaks below that are not likely enough to come from an LED source to report those peaks as such. For example, the difference in spectral energy between the pixel analyzed in cases 8 or 9 and the background case may be below the threshold, and thus neither cases 8 nor 9 are reported as corresponding to an identification of a LED. Of course, in the case of an airplane for example, as the plane proceeds toward the runway, the peaks amplify as in cases 7 through 1, at which point the pixel in question may be determined to correspond to an identification of a LED.

In other words, LED sources can be distinguished in a consistently more reliable fashion as the range to the optical sensor is diminished. A threshold of detection can therefore be selected which provides a desired signal to noise ratio from the background, which is capable of identifying individual sources in an otherwise indistinguishable scene, at all ranges closer than the limit defined by the selected threshold. That is, once the LEDs are identified, the strength of that identification will increase with diminishing range.

Figure 18:
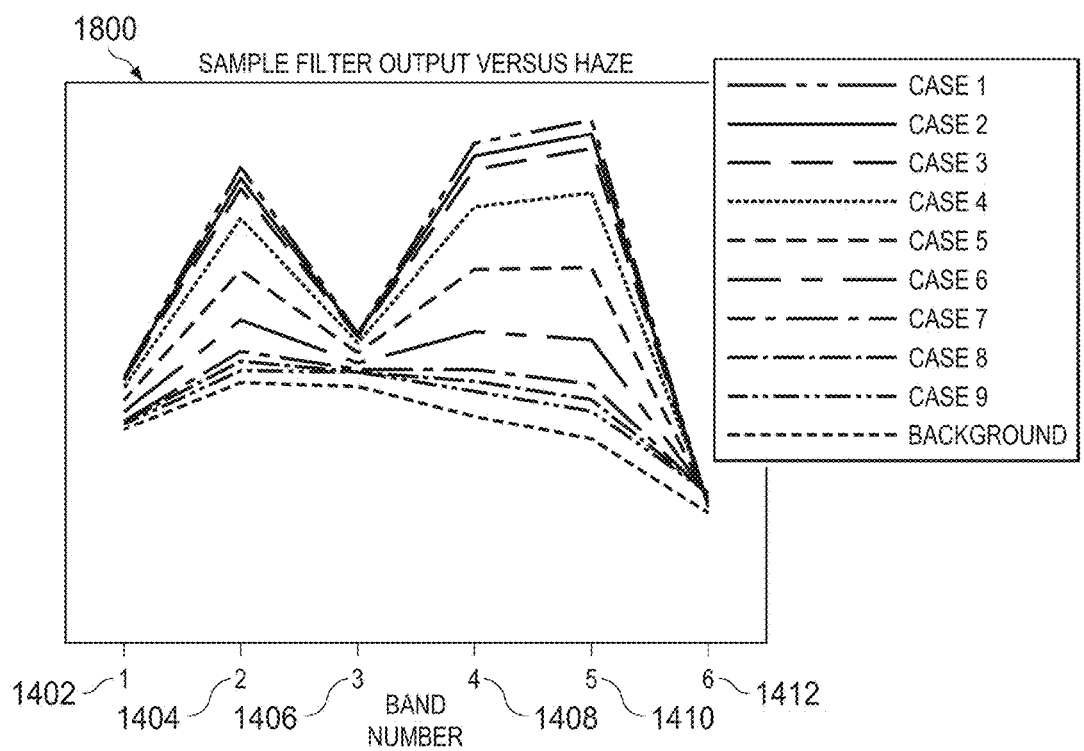
FIG. 18 shows a signal strength plot of an output of the filters of FIG. 14 as a function of haze in accordance with various embodiments of the present disclosure.

In degraded visual environments, a particular maximum range (i.e., where the difference in spectral energy between a light source and the background is below a predetermined threshold) may also be further limited by apparent haze of the scene, which may be influenced by atmospheric turbulence in the intervening media. FIG. 18 demonstrates the impact of increasing the atmospheric attenuation in a manner consistent with the absorption spectra of the atmosphere on a single source at a fixed distance; that is, FIG. 18 demonstrates the impact of increasing haze. The cases, labeled as 1-9 on the plot 1800, are again shown in increasing order, although rather than distance as in FIG. 17, a haze content of the atmosphere is increasing. As in FIG. 17, low haze conditions provide a clear spectral contrast in bands 1404, 1406, 1410 with respect to bands 1402, 1408, 1412, while increasing haze continues to diminish this contrast until it is essentially indistinguishable from the relative background of the scene.

In some embodiments of the present disclosure, the systems and methods may be expanded to provide for enhanced capability relative to the above-discussed example for distinguishing white LED sources from a background scene by taking into consideration various atmospheric properties or attributes. For example, when imaging dynamic scene conditions, more information may be available on the expected distribution of the background scene image.

As one example, in an aviation application, the optical sensor array may be divided into zones of designated scene content that address separate data arrays, determined by the user or by the processor based on the expectations of specific portions of the scene. Typical scene zones could include a sky field-of-view that is predominantly detecting atmospheric radiance, a ground field-of-view predominantly detecting down-welling radiance, and a field-of-view where light emitters are likely to be found based on the position of the aircraft (e.g., forward-facing for purposes of viewing emitters on a runway). In the particular aircraft application, altitude and heading data may be utilized to determine where sky and landing lights are likely to be found.

The altitude and heading data may already be utilized to provide simulated scenes that are sometimes used to display ground information on the HUD display at ranges where the actual scene would prove too noisy for adequate display. As the aircraft comes closer to the ground, embodiments of the present disclosure may replace the simulated scene with an actual image, including superimposed light emitters, for the pilot to make a determination of whether it is safe to land the aircraft. Although embodiments of the present disclosure are not limited to the presentation of simulated scenes, the ability to separate the scene into expected zones based upon the position and heading of the aircraft is leveraged to determine which portions of the scene are likely to be dominated by which zones when attempting to refine the method of identifying light emitters in adverse conditions, particularly in conditions where the scene may be dynamically changing.

In embodiments where dynamic scene changes are taken into account, the image sensor still acquires image data and pixel counts of all the filter bands are recorded, but separate analysis of scene content may be performed to provide further fidelity in the calibration of the background content. For example, those zones seeing predominantly atmospheric radiance may be used to provide further fidelity to the expected absorption occurring in the sensor scene content. That is, the value of atmospheric radiance is generally known, and thus deductions regarding absorption functions may be made by viewing those zones (e.g., skyward) and determining differences to a known atmospheric radiance profile. The determined absorption function may then be utilized to "correct" or provide additional fidelity to those zones seeing predominantly radiance reflected from the ground, which improves the capability to determine the relative contribution of absorption to a background spectra in zones where light emitters are likely to be found. In certain embodiments, a variety of zones provide a similar ability to leverage known radiance values to determine atmospheric or other conditional contributions to background spectra, improving the ability to separate background spectra—including those atmospheric or other conditional contributions—from the light emitters that are desired to be located in the scene.

In another similar embodiment, atmospheric properties themselves can be modeled at a higher fidelity when separating the scene in to zones. In addition to adjusting for expected absorption, a determination of the atmospheric radiance at the selected wavelength bands allows for a reconstruction of the current atmospheric radiance spectrum to provide a more accurate representation of the down-welling radiance at the selected wavelength bands that reaches the ground. A reconstruction of the concurrent ground reflection radiance spectrum is then utilized to take into account the attenuation spectrum of the atmosphere in actual measured conditions. Again, in the context of enhanced aircraft vision, the foregoing may be accomplished by a device situated proximate to the airport and configured to transmit data to incoming aircraft regarding the ascertained atmospheric radiance and concurrent ground reflection radiance spectrum.

The expected spectra of the source(s) are still discriminated with respect to the background, but uncertainties of the background pixel-counts due to noise related to the incoherent combination of all ambient and system contributions can be considerably reduced by cancelling out a more accurate representation of the background radiance. The identification of the emitter location in sensor pixel coordinates is a function of the pixel counts due to light emitters in comparison to the expected background pixel counts and, as a result, the discrimination of the emitter radiance and spectra can be reliably conducted at a considerably improved signal to noise when greater information regarding the background radiance is known. The output is still a processed image (e.g., a bitmap of emitter positions overlaying a captured image of the scene) with visible light emitters; however, the improved signal to noise provided by the increased fidelity of the atmospheric properties allows that discrimination to be made at increasing levels of distance or haze.

Figure 7:
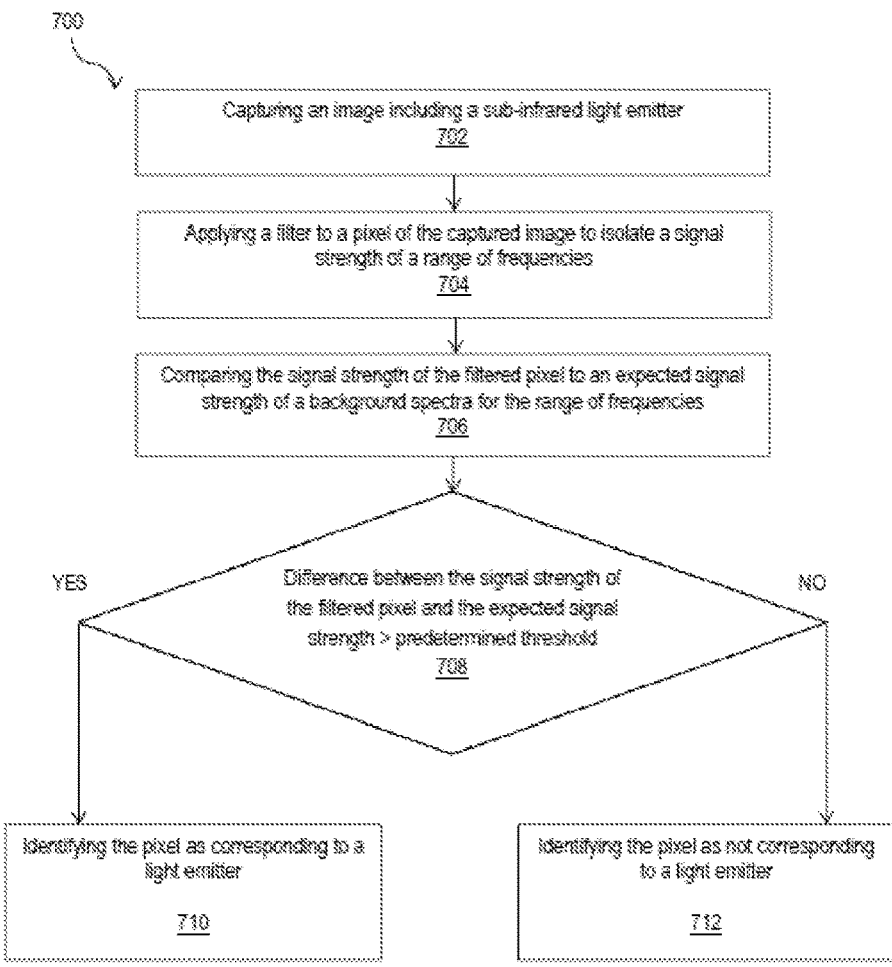
FIG. 7 shows a flow chart of a method for detecting light sources in accordance with various embodiments of the present disclosure.

Referring to FIG. 7 and the above-described embodiments, a method 700 for detecting a light source or emitter is shown. The method 700 begins in block 702 with capturing an image including a sub-infrared light emitter. As explained above, one benefit of embodiments of the present disclosure is the ability to detect light emitters that do not include an infrared component, even in scenarios where the emitters themselves are obscured by a turbid media such as haze, or are at a distance greater than what would be visible to the human eye. The method 700 continues in block 704 with applying a filter to a pixel of the capture image to isolate the signal strength of a range of frequencies. As explained above, the filter may comprise a bandpass filter, and the range of frequencies may correspond to an expected spectral peak or trough of a particular light emitter, such as a white LED. It should be appreciated that although the method 700 relates to a single pixel, certain embodiments may repeat the method 700 for all or substantially all pixels in the capture image. Thus, in some embodiments, the image captured may also be a set of predominantly monochrome images, where each image represents a certain color or wavelength (or range of colors or wavelengths) of the scene. The set of images is digitized, using the pixel coordinates and color, and stored in a buffer, constituting what may be referred to herein as a "multi-spectral cube."

The method 700 continues in block 706 with comparing the signal strength of the filtered pixel (or pixel of a filtered predominantly monochrome image) to an expected signal strength of background spectra for the range of frequencies. As explained above, a spectral signature of background scene is largely known, as it depends from black body radiation of the sun compensated for atmospheric absorption, which can be approximated as a noise component or determined experimentally, for example based on observing a region having a known spectral distribution such as the sky, and correcting for added absorption of the atmosphere. Further, as demonstrated in FIGS. 12 and 13a, the background spectra in the visible range is largely flat and without large magnitude peaks, particularly relative to those demonstrated by a light emitter as in FIG. 13b.

The method 700 continues in block 708 with determining or calculating a difference between the signal strength of the filtered pixel and the expected signal strength of the background spectra for that frequency. If the difference in strengths is above a predetermined threshold (i.e., the pixel demonstrates a higher signal strength than expected for a background-only pixel), the pixel is identified as corresponding to a light emitter in block 710. If the difference in strengths is below the predetermined threshold (i.e., the pixel demonstrates a signal strength expected for a background-only pixel, or close enough that it is presents undue risk to identify as an LED, for example in an aircraft context), the pixel is identified as not corresponding to a light emitter in block 712.

Figure 11:
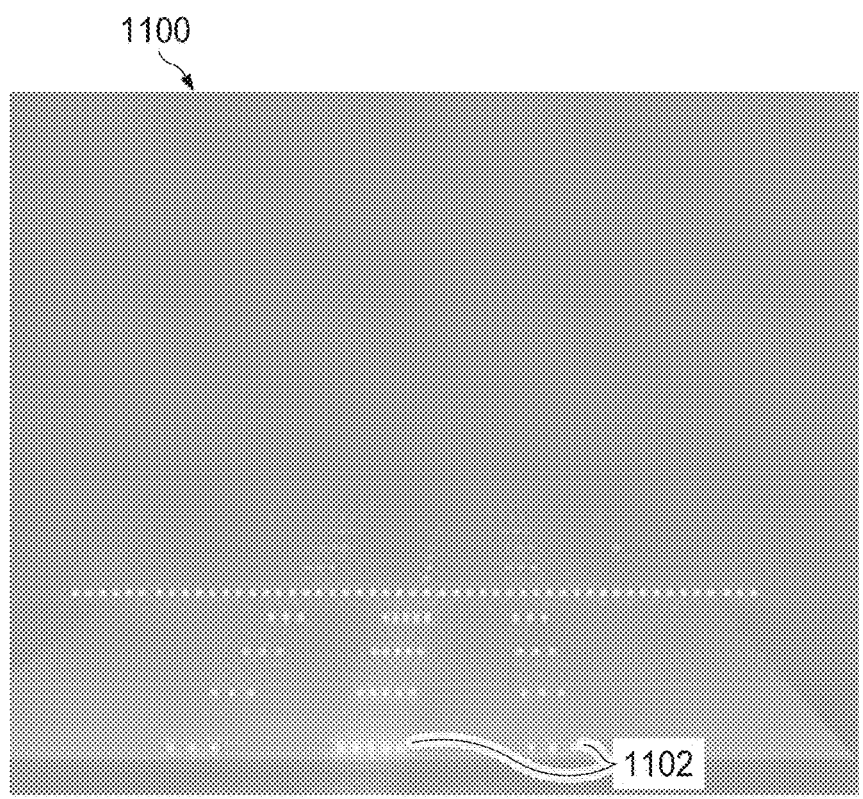
FIG. 11 shows an enhanced overlaid image of several light emitters in accordance with various embodiments of the present disclosure.

As described previously, in some cases the identification of whether a pixel corresponds to a light emitter may be used to form a bitmap of the captured image in which pixels identified as corresponding to light emitters are assigned a first value whereas pixels identified as not corresponding to a light emitter are assigned a second value. Subsequently, processing on the captured image and bitmap may overlay the bitmap on the captured image to generate an overlaid or enhanced image, in which the background and clutter are substantially reduced, the signal of light emitters (e.g., LEDs) is augmented, and a processed image is produced in which the light emitters are presented in their true location in the sensor coordinates. These coordinates may be overlaid with an existing scene image on the HUD or HDD, which may not otherwise provide a clear recognition of the light emitters. In the example of aviation applications, this provides the pilot with a means of distinguishing the runway lights 1102, which may be LEDs (or other emitters having low IR spectral components), even in the presence of dense fog, for example as illustrated in FIG. 11.

In some embodiments, the method 700 also includes applying multiple filters to the pixel to isolate signal strengths for various ranges of frequencies corresponding to the multiple filters. The method 700 may also include analyzing a light emitter spectral radiance to identify peaks and troughs for the purpose of experimentally determining frequency ranges where a bandpass filter would capture important portions of the emitter signature. The usefulness of identifying peaks in the emitter spectra is explained above, particularly with respect to FIG. 14. However, identifying troughs in the spectra may also be useful to provide a relative reference for peaks; in particular, since scenery content can vary dramatically depending on viewing conditions, the relative difference between an expected trough and an expected peak may be leveraged to reduce instances of false positives or false negatives.

Figure 19:
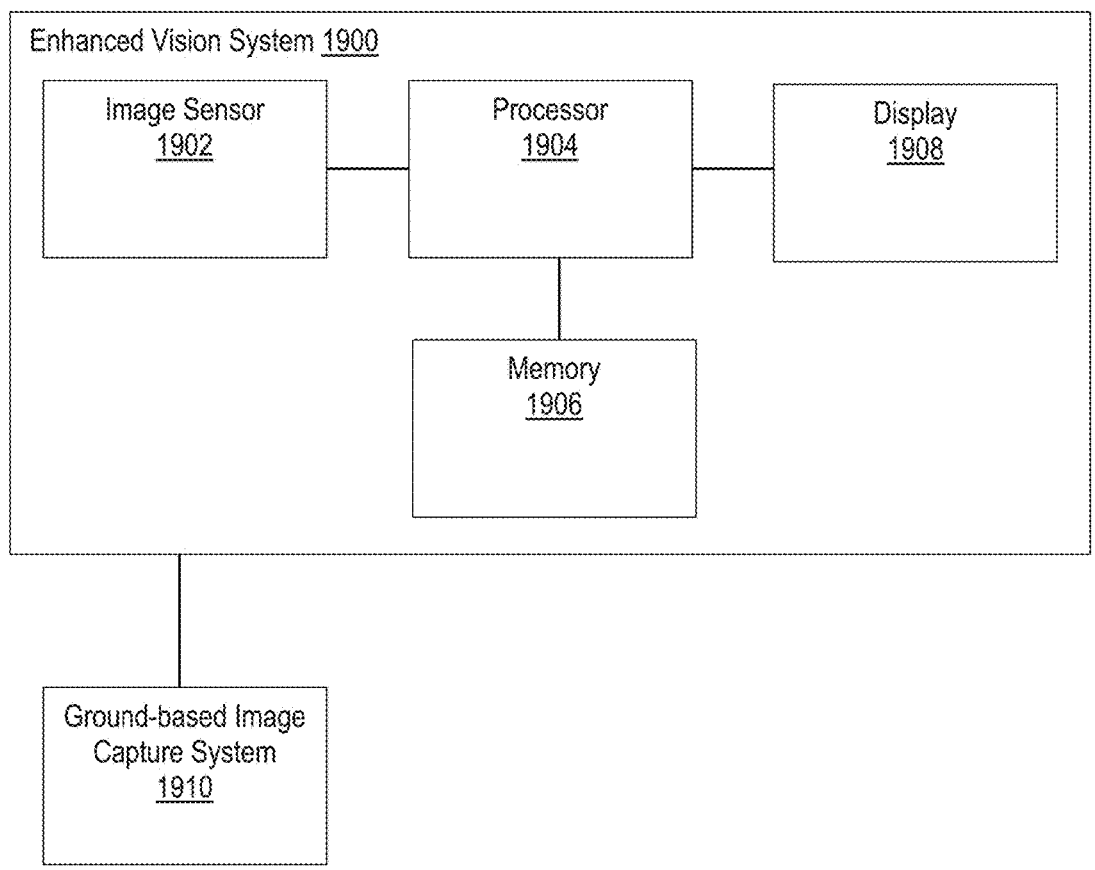
FIG. 19 shows an exemplary system block diagram detecting light sources in accordance with various embodiments of the present disclosure.

Turning to FIG. 19, a system is shown in accordance with various embodiments. The system may be, for example, an enhanced vision system 1900 for use in an aircraft or other application where augmenting an operators perception of the surrounding environment is useful. The system 1900 includes an image sensor 1902 coupled to a processor 1904 and a memory 1906. The system 1900 may also optionally include a display 1908, such as a HUD or HDD. As will be explained further below, the system 1900 may also be coupled to a ground-based image capture system 1910, for example by way of a wireless or satellite link.

Similar to above, the image sensor 1902 is configured to capture an image including a sub-infrared light emitter. The captured image, as well as other processed versions of the image (e.g., the set of predominantly monochrome images, where each image represents a certain color or wavelength, or the above-described multi-spectral cube) may be stored in the memory 1906. The processor 1904 is configured to receive the captured image, for example from the sensor 1902 or memory 1906, and apply a filter (e.g., a bandpass filter) to a pixel of the captured image in order to isolate a signal strength component of a range of frequencies corresponding to that filter.

The processor 1904 is also configured to compare the signal strength of the filtered pixel to an expected signal strength of a background spectra for the range of frequencies. If the difference in strengths is above a predetermined threshold (i.e., the pixel demonstrates a higher signal strength than expected for a background-only pixel), the processor 1904 is configured to identify the pixel as corresponding to a light emitter. If the difference in strengths is below the predetermined threshold (i.e., the pixel demonstrates a signal strength expected for a background-only pixel, or close enough that it is presents undue risk to identify as an LED, for example in an aircraft context), the processor 1904 is configured to identify the pixel as not corresponding to a light emitter.

In some embodiments, the processor 1904 is configured to generate a bitmap composed of identifications of whether the various pixels correspond to a light emitter, in which pixels identified as corresponding to light emitters are assigned a first value whereas pixels identified as not corresponding to a light emitter are assigned a second value. Subsequently, the processor 1904 may overlay the bitmap on the captured image to generate an overlaid or enhanced image, in which the background and clutter are substantially reduced, the signal of light emitters (e.g., LEDs) is augmented, and a processed image is produced in which the light emitters are presented in their true location in the sensor coordinates. The processor 1904 may cause the display 1908 to display these coordinates with an existing scene image, for example as a HUD or HDD, which may not otherwise provide a clear recognition of the light emitters. In the example of aviation applications, this provides the pilot with a means of distinguishing the runway lights 1102, which may be LEDs (or other emitters having low IR spectral components), even in the presence of dense fog, for example as illustrated in FIG. 11.

In other embodiments, the ground-based image capture system 1910 may be used to detect atmospheric properties at a higher fidelity than when separating a captured scene viewed by the image sensor 1902 in to zones, as described above. The captured image data from capture system 1910 may be used to determine the atmospheric radiance at particular selected wavelength bands, which allows for a reconstruction of the current atmospheric radiance spectrum to provide a more accurate representation of the downwelling radiance at the selected wavelength bands that reaches the ground. The processor 1904 may receive various information from the capture system 1910; however, it should be appreciated that in general, a reconstruction of the concurrent ground reflection radiance spectrum may be utilized to take into account the attenuation spectrum of the atmosphere in actual measured conditions. As one example, the capture system 1910 is situated proximate to the airport and configured to transmit data to incoming aircraft regarding the ascertained atmospheric radiance and concurrent ground reflection radiance spectrum. Thus, in the context of enhanced aircraft vision, aircraft approaching such an airport will be provided with improved information regarding the atmospheric attenuation in actual conditions, or in a real time manner.

In some embodiments, the processor 1904 may also be configured to apply multiple filters to the pixel to isolate signal strengths for various ranges of frequencies corresponding to the multiple filters. The processor 1904 may also be configured to analyze a light emitter spectral radiance to identify peaks and troughs for the purpose of experimentally determining frequency ranges where a bandpass filter would capture important portions of the emitter signature. The usefulness of identifying peaks in the emitter spectra is explained above, particularly with respect to FIG. 14. However, identifying troughs in the spectra may also be useful to provide a relative reference for peaks; in particular, since scenery content can vary dramatically depending on viewing conditions, the relative difference between an expected trough and an expected peak may be leveraged to reduce instances of false positives or false negatives.

Sensor

In the above-described embodiments, the sensor receives a set of monochromatic images whose colors are defined by the bandpass filters. Its responsivity band is spectrally broad, predominantly spanning the bandpass region over which a substantial fraction of the incident photons that are absorbed generate electrons. Although the sensor is predominantly insensitive to a particular color, or a narrow spectral slice of its range of responsivity, photon flux incident on the sensor pixels have certain colors, which are determined by the bandpass of the bandpass filters disposed between the sensor and the object (e.g., LED). In one embodiment, the monochromatic images are rendered in a temporal fashion, where during a single scan of the sensor area, pixel counts are obtained that correspond to a certain color defined by a bandpass filter. A multi-spectral cube results from compiling the set of pre-defined wavelength bands constitutes. Subsequently, additional multi-spectral cubes are rendered and transmitted, resulting in a dynamic progression of images, or so-called footage.

In another embodiment, the plurality of monochromatic image renditions is accomplished in a localized manner, where sub-pixel counts are generated by a mosaic-like, squarely-arrayed bandpass filter(s). In this embodiment, in a single scan of the sensor area, pixel counts of disparate colors are available, defined by bandpass filters corresponding to specific locations relative to the sensor coordinate space, thus resulting in a multi-spectral cube. As above, additional multi-spectral cubes are rendered and transmitted, again resulting in the generation of footage. Depending on the desired spectral discrimination characteristics, this may be performed on a variety of spectral band divisions, such as a 3×3 pixel sub-array to provide for 9 sensor array zones, a 4×4 pixel sub-array to provide for 16 sensor array zones, etc. This disclosure is not intended to be limited to a specific embodiment of the either the sensor array or its specific filter selections.

In order to enhance the detector sensitivity, such as the ability to detect and image light sources through a turbid medium such as fog, a high level of sensor acuteness may be required. Particular sensor parameters that may enhance the acuteness of the image include: broad spectral sensitivity; high quantum efficiency; high pixel resolution; low electronic noise (e.g., 1/f, generation-recombination, dark current, Johnson and readout noises); and large dynamic range or high A/D conversion resolution. In certain embodiments, the sensor is a silicon based CMOS type, sensitive over 400-1100 nm, having quantum efficiency of 60% at 650 nm, having 2048×2048 pixels, readout noise of 1 electron/pixel, and a 16-bit A/D conversion resolution.

Light Sources

One object of this disclosure is the detection of visible light sources through turbid obstructers. Light sources are typified by their level of radiance, spectral emittance and etendue. These vary over very broad ranges. For instance, black body emitters encompass the entire electromagnetic spectrum, while lasers may have a very narrow wavelength width, which can be on the order of picometers. Other sources, though designed for lighting in the visible range, still generate emission in the IR range. In certain embodiments, although not limiting, the emitting sources are LEDs that emit predominantly in the visible range.

In an embodiment, the LED is a white emitting diode having an emission spectrum represented by the plot in FIG. 8. In the double-hump structure, the spectrum spans the range of 410-750 nm, all included in the visible range, and has no components in the IR range. In another embodiment, the LED may be a blue light emitting diode having an emission spectrum represented by the plot in FIG. 9. It has a spectrum centered at 468 nm and a FWHM width of 23 nm. In yet another embodiment, the LED may be a red light emitting diode having an emission spectrum represented by the plot in FIG. 10. It has a spectrum centered at 630 nm and a FWHM width of 17 nm. In a further embodiment the source is an LED lamp used in an Approach Light System (ALS) or Medium Intensity Approach Lighting System with Runway Alignment Indicator Lights (MALSR) of an airport runway. There are additional light emitting sources effective for this disclosure, and none of the above mentioned embodiments should be construed to place any limitations on the disclosure as a whole.

The Turbid Medium

Various turbid media in the optical path between the object light (e.g., an LED) and the detector attenuate the source radiance and contribute background radiance of their own. As a result, the object light is obscured to a viewer located proximate the detector, such as an aircraft, automobile, or boat pilot. The turbid media may include environmental media such as fog, clouds, rain, hail, and snow. In this disclosure, the method enables the detection of obscured light sources from a distance exceeding the ambient visibility range. The term visibility is defined as the range at which a light is detectable by the human eye. That in turn is inversely proportional to light attenuation.

In an embodiment, the detector can detect white LED with CCT (Correlated Color Temperature) of 3500K emitting 20 W into a cone of 10 degrees from a distance of 1160 meters where the ambient visibility is in the range of 350-800 meters. In another embodiment these parameters correspond to the scenario of an aircraft landing at a descent angle of 3 degrees and an altitude of 200 feet, with fog permitting a visibility of 350-800 meters RVR (Runway Visual Range) at the landing. In yet another embodiment the detector is mounted in an aircraft, providing image data to the pilot, which allows to the pilot to view an image of the LED light from an increased distance relative to the ambient visibility. The actual ranges are a function of the system design and should not be construed to place limitations on the disclosure.

Embodiments of the present disclosure may also be directed to a non-transitory computer-readable medium. Such a computer-readable medium may contain instructions that, when executed by a processor (e.g., processor 1904), cause the processor to carry out all or portions of the methods and processes described herein.

The above discussion is meant to be illustrative of the principles and various embodiments of the present disclosure. Numerous variations and modifications will become apparent to those skilled in the art once the above disclosure is fully appreciated. For example, although reference is often made to an airport-based or aircraft-based embodiment, the present disclosure may be employed on naval craft (and, for example, a port authority), automobiles, or other situations in which enhanced vision may be desired and where low-IR light sources are employed. It is intended that the following claims be interpreted to embrace all such variations and modifications.

What is claimed is:

1. A method comprising:
capturing an image including a sub-infrared light emitter;
applying a filter to a pixel of the captured image to isolate a signal strength of a range of frequencies, wherein the filter is tunable to the range of frequencies by tilting the filter;
comparing the signal strength of the filtered pixel to an expected signal strength of a background spectra for the range of frequencies;
as a result of a difference between the signal strength of the filtered pixel and the expected signal strength exceeding a predetermined threshold, identifying the pixel as corresponding to a light emitter;
as a result of the difference between the signal strength of the filtered pixel and the expected signal strength not exceeding a predetermined threshold, identifying the pixel as not corresponding to a light emitter;
capturing an image of a zone having a known spectral profile, the image having an actual spectral profile, wherein the image is captured by a ground-based image capture system proximate to an airport;
comparing the actual spectral profile to the known spectral profile and determining an atmospheric contribution profile bases on the comparison;
modifying the expected signal strength of the background spectra for the range of frequencies based on the atmospheric contribution profile; and
transmitting the atmospheric contribution profile or the modified expected signal strength to an aircraft proximate to the airport.

2. The method of claim 1 further comprising:
analyzing a spectral radiance of the light emitter and identifying a spectral peak of the light emitter; and
utilizing a range of frequencies corresponding to the spectral peak in applying the filter.

3. The method of claim 2 wherein more than one spectral peak is identified, the method further comprising:
applying a plurality of filters to the pixel, each of the plurality to isolate a signal strength of a range of frequencies corresponding to one of the spectral peaks.

4. The method of claim 1 further comprising:
analyzing a spectral radiance of the light emitter and identifying a spectral trough of the light emitter; and
applying a filter to the pixel of the captured image to isolate a signal strength of a range of frequencies corresponding to the spectral trough.

5. The method of claim 1 wherein the zone having a known spectral profile comprises zone including a skyward-facing component.

6. The method of claim 1 further comprising:
repeating the steps of applying, comparing, and identifying for each of a plurality of pixels of the captured image; and
generating a bitmap image, wherein pixels corresponding to a light emitter are assigned a first value and pixels not corresponding to a light emitter are assigned a second value.

7. The method of claim 6 further comprising:
overlaying the bitmap image on the captured image to generate an overlaid image; and
projecting the overlaid image as a heads-up display including indications of the light emitters.

8. A system comprising:
an image sensor configured to capture an image including a sub-infrared light emitter;
a memory configured to store the captured image;
a processor configured to:
receive the captured image and apply a filter to a pixel of the captured image to isolate a signal strength of a range of frequencies, wherein the filter is tunable to the range of frequencies by tilting the filter;
compare the signal strength of the filtered pixel to an expected signal strength of a background spectra for the range of frequencies;
as a result of a difference between the signal strength of the filtered pixel and the expected signal strength exceeding a predetermined threshold, identify the pixel as corresponding to a light emitter;

as a result of the difference between the signal strength of the filtered pixel and the expected signal strength not exceeding a predetermined threshold, identify the pixel as not corresponding to a light emitter;

a ground-based image capture system proximate to an airport configured to:

capture an image of a zone having a known spectral profile, the image having an actual spectral profile;

compare the actual spectral profile to the known spectral profile and determine an atmospheric contribution profile based on the comparison; and transmit the atmospheric contribution profile to the processor, wherein the processor is further configured to modify the expected signal strength of the background spectra for the range of frequencies based on the atmospheric contribution profile.

9. The system of claim 8 wherein the processor is further configured to:

analyze a spectral radiance of the light emitter and identify a spectral peak of the light emitter; and utilize a range of frequencies corresponding to the spectral peak when the filter is applied.

10. The system of claim 9 wherein more than one spectral peak is identified, and the processor is further configured to:

apply a plurality of filters to the pixel, each of the plurality to isolate a signal strength of a range of frequencies corresponding to one of the spectral peaks.

11. The system of claim 8 wherein the processor is contained in an aircraft enhanced vision system.

12. The system of claim 8 wherein the processor is further configured to:

repeat the steps to apply, compare, and identify light emitters for each of a plurality of pixels of the captured image; and generate a bitmap image, wherein pixels corresponding to a light emitter are assigned a first value and pixels not corresponding to a light emitter are assigned a second value.

13. The system of claim 12 wherein the processor is further configured to:

overlay the bitmap image on the captured image to generate an overlaid image; and cause a heads-up display to project the overlaid image including indications of the light emitters.

14. A non-transitory computer readable medium comprising instructions that, when executed by a processor, cause the processor to:

receive a captured image including a sub-infrared light emitter;

apply a filter to a pixel of the captured image to isolate a signal strength of a range of frequencies, wherein the filter is tunable to the range of frequencies by tilting the filter;

compare the signal strength of the filtered pixel to an expected signal strength of a background spectra for the range of frequencies; and as a result of a difference between the signal strength of the filtered pixel and the expected signal strength exceeding a predetermined threshold, identify the pixel as corresponding to a light emitter; or as a result of the difference between the signal strength of the filtered pixel and the expected signal strength not exceeding a predetermined threshold, identify the pixel as not corresponding to a light emitter;

capture an image of a zone having a known spectral profile, the image having an actual spectral profile, wherein the image is captured by a ground-based image capture system proximate to an airport;

compare the actual spectral profile to the known spectral profile and determining an atmospheric contribution profile based on the comparison;

modify the expected signal strength of the background spectra for the range of frequencies based on the atmospheric contribution profile; and transmit the atmospheric contribution profile or the modified expected signal strength to an aircraft proximate to the airport.

15. The non-transitory computer readable medium of claim 14 wherein the instructions further cause the processor to:

apply a plurality of filters to the pixel, each of the plurality to isolate a signal strength of a range of frequencies corresponding to an identified spectral peak of a spectral radiance of the light emitter.

16. The non-transitory computer readable medium of claim 14 wherein the instructions further cause the processor to:

repeat the steps to apply, compare, and identify light emitters for each of a plurality of pixels of the captured image; and generate a bitmap image, wherein pixels corresponding to a light emitter are assigned a first value and pixels not corresponding to a light emitter are assigned a second value.

17. The non-transitory computer readable medium of claim 16 wherein the instructions further cause the processor to:

overlay the bitmap image on the captured image to generate an overlaid image; and cause a heads-up display to project the overlaid image including indications of the light emitters.

* * * * *